United States Patent
Shin et al.

(10) Patent No.: US 10,663,056 B2
(45) Date of Patent: May 26, 2020

(54) OIL PRESSURE SUPPLY SYSTEM DISTRIBUTING LUBRICATION FOR A DUAL CLUTCH TRANSMISSION

(71) Applicants: HYUNDAI MOTOR COMPANY, Seoul (KR); KIA MOTORS CORPORATION, Seoul (KR)

(72) Inventors: Yong Uk Shin, Suwon-si (KR); Ki Dong Kim, Anyang-si (KR); Wonmin Cho, Hwaseong-si (KR); Sun Sung Kwon, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 115 days.

(21) Appl. No.: 15/976,373

(22) Filed: May 10, 2018

(65) Prior Publication Data
US 2019/0128399 A1    May 2, 2019

(30) Foreign Application Priority Data

Oct. 30, 2017  (KR) .......................... 10-2017-0142175

(51) Int. Cl.
| | |
|---|---|
| *F16H 57/04* | (2010.01) |
| *F16H 61/00* | (2006.01) |
| *F16H 61/02* | (2006.01) |

(52) U.S. Cl.
CPC ..... *F16H 57/0435* (2013.01); *F16H 57/0404* (2013.01); *F16H 57/0412* (2013.01);
(Continued)

(58) Field of Classification Search
CPC ............. F16H 57/0435; F16H 57/0404; F16H 57/0412; F16H 57/0436; F16H 61/0021;
(Continued)

(56) References Cited

U.S. PATENT DOCUMENTS

| | | | |
|---|---|---|---|
| 5,662,550 A | * | 9/1997 | Jang .................... F16H 61/0206 477/130 |
| 7,766,139 B2 | * | 8/2010 | De Maziere .......... F16D 25/123 192/113.3 |

(Continued)

FOREIGN PATENT DOCUMENTS

| JP | 2006316819 | 11/2006 |
|---|---|---|
| KR | 101461894 | 11/2014 |
| KR | 101566728 | 11/2015 |

*Primary Examiner* — Tinh Dang
(74) *Attorney, Agent, or Firm* — Lempia Summerfield Katz LLC

(57) ABSTRACT

An oil pressure supply system distributes lubrication for a dual clutch transmission and an includes a mechanical oil pump pumping oil stored in a sump while being driven by an engine; a line regulator valve directly supplying a lubrication flow rate to an input shaft and a counter shaft by controlling the oil pressure supplied from the mechanical oil pump and simultaneously supplying the lubrication flow rate to a gear train and clutch through another path; a line pressure control valve variably exhausting the lubrication oil pressure when the lubrication oil pressure supplied to the input shaft and the counter shaft is a predetermined value or more; an electric oil pump pumping the oil depending on a control of a transmission control unit; a first lubrication switch valve selectively blocking oil pressure supplied from the electric oil pump to the gear train and the clutch; and a second lubrication switch valve switching a flow path so that oil pressure supplied from the line regulator valve and the first lubrication switch valve is selectively supplied to the gear train and the clutch.

13 Claims, 4 Drawing Sheets

(52) U.S. Cl.
CPC ..... *F16H 57/0436* (2013.01); *F16H 61/0021*
(2013.01); *F16D 2300/021* (2013.01); *F16D
2300/06* (2013.01); *F16H 2061/0037*
(2013.01); *F16H 2061/0046* (2013.01)

(58) Field of Classification Search
CPC ............. F16H 61/0031; F16H 61/0206; F16H
2061/0046; F16D 2300/021; F16D
2300/06; F16D 2061/0037
See application file for complete search history.

(56) References Cited

U.S. PATENT DOCUMENTS

| | | |
|---|---|---|
| 9,108,499 B2 * | 8/2015 | Long ........................ B60K 6/12 |
| 9,366,337 B2 | 6/2016 | Wi |
| 9,574,655 B2 | 2/2017 | Hwang |
| 10,066,723 B2 * | 9/2018 | Pritchard ............ F16H 57/0483 |
| 10,274,073 B1 * | 4/2019 | Shin ................... F16H 57/0413 |
| 2015/0075154 A1 | 3/2015 | Wi |
| 2015/0167835 A1 | 6/2015 | Hwang |

\* cited by examiner

OIL PRESSURE SUPPLY SYSTEM DISTRIBUTING LUBRICATION FOR A DUAL CLUTCH TRANSMISSION

CROSS-REFERENCE TO RELATED APPLICATION

This application claims priority to and the benefit of Korean Patent Application No. 10-2017-0142175 filed in the Korean Intellectual Property Office on Oct. 30, 2017, the entire contents of which are incorporated herein by reference.

BACKGROUND

(a) Field of the Disclosure

The present disclosure relates to an oil pressure supply system that distributes lubrication for a dual clutch transmission. More particularly, the present disclosure relates to an oil pressure supply system that distributes lubrication for a dual clutch transmission applying an electric oil pump as an auxiliary function for reducing a load of a mechanical oil pump to improve fuel consumption.

(b) Description of the Related Art

In recent years, as oil prices have increased worldwide and as exhaust gas discharge regulations have gotten more restrictive, car makers have devoted substantial resources to technological development which can improve fuel efficiency through environmentally friendly techniques.

Enhancement of the fuel efficiency in an automatic transmission can be implemented by improving power delivery efficiency. The improvement in power delivery efficiency may be implemented by minimizing unnecessary power consumption of an oil pump.

However, a conventional automatic transmission is configured having a system in which oil pressure, pumped from a mechanical pump driven by power from an engine, is controlled by a pressure control valve to be supplied to each shifting portion. Thus, flow amount control is impossible such that an unnecessary power loss is generated.

More particularly, the power loss is generated due to the generation of the unnecessary oil pressure in a high revolutions per minute (RPM) range. Thus, there is a problem of reducing the fuel efficiency.

The above information disclosed in this Background section is only to enhance the understanding of the background of the disclosure. Therefore, the Background section may contain information that does not form the prior art that is already known in this country to a person of ordinary skill in the art.

SUMMARY

An embodiment of the present disclosure provides an oil pressure supply system that distributes or divides lubrication for a dual clutch transmission for improving the fuel economy or fuel efficiency, i.e., reduces fuel consumption by simultaneously applying a mechanical oil pump and an electric oil pump and reducing a load of the mechanical oil pump through an auxiliary function of the electric oil pump.

An oil pressure supply system that distributes lubrication for a dual clutch transmission according to an embodiment of the present disclosure includes a mechanical oil pump pumping an oil stored in a sump with an oil pressure of high pressure while being driven by an engine. The system also includes a line regulator valve directly supplying a lubrication flow rate to an input shaft and a counter shaft by stably controlling the oil pressure supplied from the mechanical oil pump and simultaneously supplying the lubrication flow rate to a gear train and clutch through another path. The system also includes a line pressure control valve variably exhausting the lubrication oil pressure when the lubrication oil pressure supplied to the input shaft and the counter shaft is a predetermined value or more. The system also includes an electric oil pump pumping the oil stored in the sump with the oil pressure of high pressure while being driven depending on a control of a transmission control unit. The system also includes a first lubrication switch valve selectively blocking the supply of the oil pressure supplied from the electric oil pump to the gear train and the clutch. The system also includes a second lubrication switch valve switching a flow path so that the oil pressure supplied from the line regulator valve and the first lubrication switch valve is selectively supplied to the gear train and the clutch and includes a line pressure flow path connecting the mechanical oil pump and the line regulator valve. The system also includes: a first flow path connecting the line regulator valve, the input shaft, and the counter shaft; a second flow path connecting the electric oil pump and the first lubrication switch valve and connected to the line pressure flow path; a third flow path connected to the first flow path and the first lubrication switch valve and supplying the oil pressure of the first flow path and the first lubrication switch valve to the second lubrication switch valve; a fourth flow path connected to the third flow path by interposing a cooler and a pressure filter and supplying the oil pressure of the third flow path to the clutch; a fifth flow path connecting a downstream side of the fourth flow path and the second lubrication switch valve; a sixth flow path connecting an upstream side of the fourth flow path and the second lubrication switch valve; and a seventh flow path connecting the second lubrication switch valve and the gear train.

The line regulator valve may be formed of a spool valve and may be controlled by the oil pressure of the line pressure flow path acted on one side end, the control pressure of a first solenoid valve acted on an opposite side to correspond to the oil pressure of the line pressure flow path, and an elastic force of an elastic member.

The line pressure control valve may be formed of a spool valve and may be controlled by the oil pressure of the first flow path acted on one side end, the control pressure of a first solenoid valve acted on the opposite side to correspond to the oil pressure of the first flow path, and the elastic force of the elastic member.

The first solenoid valve may be an N/H type linear solenoid valve in which the oil pressure is not formed in a normal state.

The first lubrication switch valve may be a spool valve and may selectively connect the second flow path and the third flow path while being controlled by an elastic member disposed at one side end and the control pressure of a second solenoid valve acted on the opposite side to correspond to the elastic force of the elastic member.

The second solenoid valve may be an N/L type on/off solenoid valve in which the oil pressure is not formed in a normal state.

The second lubrication switch valve may be a spool valve and may selectively connect the third flow path to the fifth flow path or the sixth flow path to the seventh flow path while being controlled by an elastic member disposed on one side end and the control pressure of a third solenoid valve acted on the opposite side to correspond to the elastic force of the elastic member.

The third solenoid valve may be the N/L type on/off solenoid valve in which the oil pressure is not formed in the normal state.

A cooler flow rate control valve may be disposed in parallel to the cooler and the pressure filter between the fifth flow path and the sixth flow path.

The cooler flow rate control valve may be a spool valve and may control the flow rate of the third flow path depending on a valve spool so as to variably flow to the sixth flow path while the valve spool moves right and left by the oil pressure of the third flow path acted on one side end, the oil pressure of the sixth flow path acted on the opposite side to correspond to the oil pressure of the third flow path, and an elastic force of an elastic member.

The cooler flow rate control valve may be a check valve permitting only the flow rate supplied from the third flow path to the sixth flow path.

Three check valves may be further provided on the line pressure flow path and the third flow path. The first check valve may permit only the flow rate supplied from the second flow path to the line pressure flow path. The second check valve may permit only the flow rate supplied from the first lubrication switch valve to the third flow path. The third check valve may permit only the flow rate supplied from the first flow path to the third flow path.

The oil pressure supply system that distributes the lubrication for the dual clutch transmission according to an embodiment of the present disclosure assists the line pressure by the electric oil pump to reduce the capacity of the mechanical oil pump. Accordingly, the flow rate supply may be stable and the driving loss of the mechanical oil pump may be reduced, thereby improving the fuel consumption.

Also, the oil pressure supply system that distributes the lubrication for the dual clutch transmission according to an embodiment of the present disclosure supplies the lubrication flow rate by the mechanical oil pump to the input shaft and the counter shaft linked with the engine RPM and appropriately supplies the sum of the lubrication flow rate of the mechanical oil pump and the electric oil pump to the clutch and the gear train that are linked with the engine RPM. The lubrication driving of the electric oil pump thus is minimized, thereby improving the fuel efficiency or fuel economy, i.e., reducing fuel consumption.

Also, the oil pressure supply system that distributes the lubrication for the dual clutch transmission according to an embodiment of the present disclosure minimizes the lubrication driving of the electric oil pump and reduces a churning loss by the unnecessary lubrication flow rate. The fuel efficiency or fuel economy may be improved. Further, as the necessary flow rate is supplied at a timing that the lubrication is required, a durability of the transmission may be improved.

Also, the oil pressure supply system that distributes the lubrication for the dual clutch transmission according to an embodiment of the present disclosure supplies the oil pressure of the electric oil pump by bypassing the cooler since the clutch requires the large flow rate instantaneously during the clutch large flow rate condition. The effective lubrication flow rate supply may thus be obtained.

Also, the oil pressure supply system that distributes the lubrication for the dual clutch transmission according to an embodiment of the present disclosure resultantly reduces the capacity of the mechanical oil pump. The power delivery performance may thus be improved and the fuel efficiency or fuel economy and the transmission durability may be simultaneously improved through the efficiency of the driving condition and the lubrication of the electric oil pump.

Figure 1:
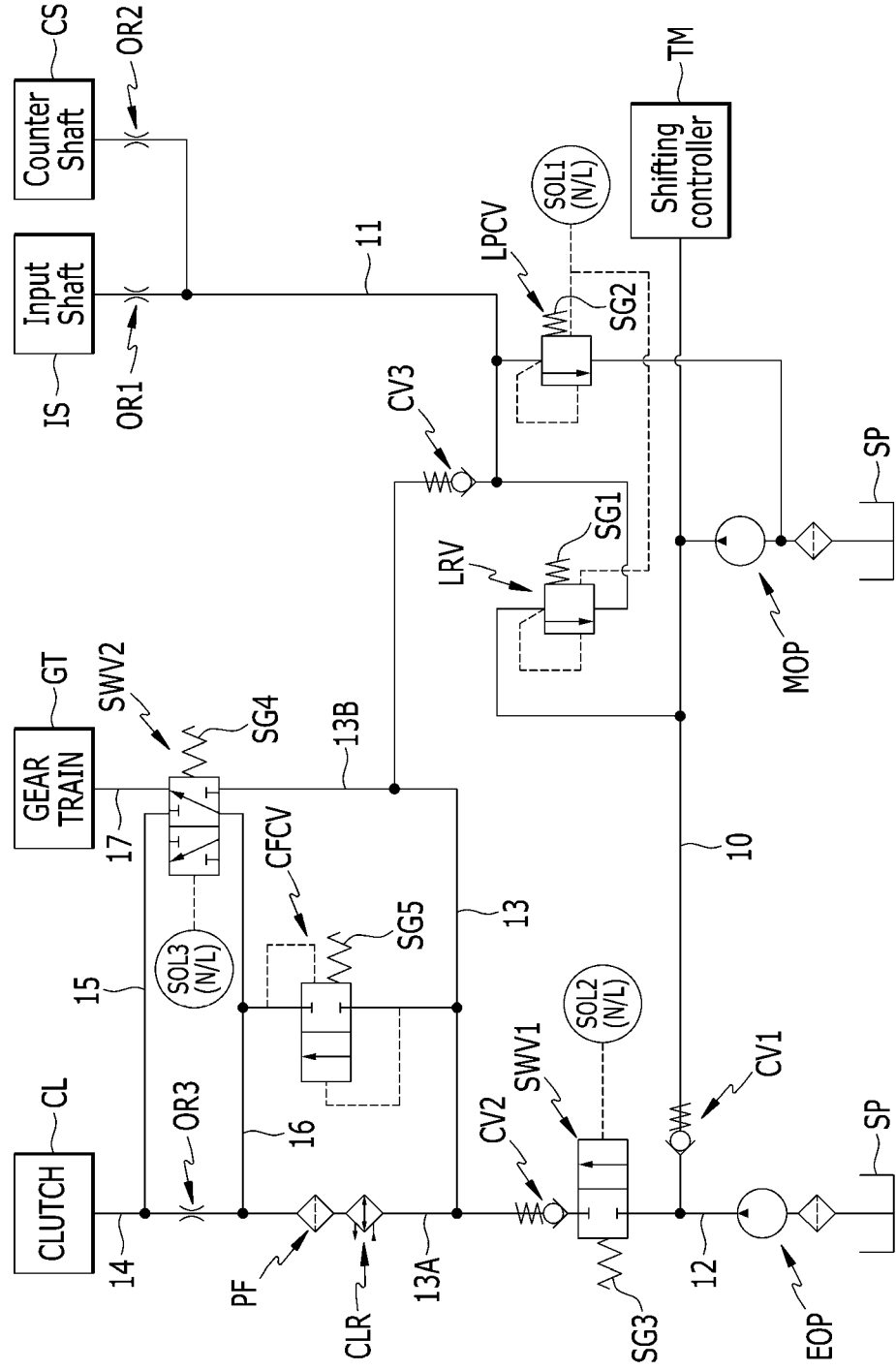
FIG. 1 is an oil pressure circuit diagram of an oil pressure supply system according to a first embodiment of the present disclosure.

The following reference numbers and symbols are used throughout the drawings and written description.
10: line pressure flow path
11, 12, 13, 14, 15, 16, 17: first, second, third, fourth, fifth, sixth and seventh flow paths
CV1, CV2, CV3: first, second and third check valves
CFCV: cooler flow rate control valve
EOP: electric oil pump
LPCV: line pressure control valve
LRV: line regulator valve
MOP: mechanical oil pump
OR1, OR2, OR3: first, second and third orifices
SOL1, SOL2, SOL3: first, second and third solenoid valves
CL: clutch
GT: gear train
IS: input shaft
CS: counter shaft

DETAILED DESCRIPTION OF THE EMBODIMENTS

The present disclosure is described more fully hereinafter with reference to the accompanying drawings, in which embodiments of the disclosure are shown. As those having ordinary skill in the art would realize, the described embodiments may be modified in various different ways, all without departing from the spirit or scope of the present disclosure.

The drawings and description are to be regarded as illustrative in nature and not restrictive. Also, like reference numerals designate like elements throughout the specification.

In the following description, differentiating names of components using first, second and the like is done to differentiate the names because the names of the components are the same as each other. An order of such components is not particularly intended.

FIG. 1 is an oil pressure circuit diagram of an oil pressure supply system according to a first embodiment of the present disclosure.

The oil pressure supply system according to the first embodiment of the present disclosure is applied to a dual clutch transmission (hereinafter, referred to as a DCT).

The DCT includes two clutch devices and a gear train of a basic manual transmission. The DCT may selectively transmit a rotation power of an engine by using two clutch devices to two input shafts. The DCT may shift and output the rotation power transmitted to the input shafts while alternately operating the rotation power to an odd-numbered shift-stage and an even-numbered shift-stage through synchronizing devices of a gear train controlled by a transmission control unit.

Accordingly, the DCT may be implemented by an auto manual transmission (AMT) that eliminates the necessity for manual shifting by a driver.

An oil pressure control system applied to the DCT may include a mechanical oil pump MOP, an electric oil pump EOP, a line regulator valve LRV, a line pressure control valve LPCV, a first and a second lubrication switch valve SWV1 and SWV2, a cooler flow rate control valve CFCV, first, second and third check valves CV1, CV2, and CV3, first, second and third orifices OR1, OR2, and OR3, and first, second and third solenoid valves SOL1, SOL2, and SOL3.

The mechanical oil pump MOP is driven by the engine and pumps a fluid stored in a sump SP. The mechanical oil pump MOP is always driven, if the engine is driven, to discharge the fluid to a line pressure flow path 10.

The line regulator valve LRV stably controls the oil pressure supplied through the line pressure flow path 10 such that a part thereof is supplied to a shifting controller TM and a part thereof is supplied to a lubrication oil pressure through a first flow path 11.

The line regulator valve LRV is formed of a spool valve to control an opening area, in which a valve spool is installed to a valve body and is movable right and left.

The line regulator valve LRV controls the oil pressure of the line pressure flow path 10 acted to one side end, and the line pressure depending on a movement amount thereof while the valve spool moves right and left by the control pressure of the first solenoid valve SOL1 acted to the opposite side to correspond to the oil pressure of the line pressure flow path 10 and an elastic force of an elastic member SG1.

In the above, the shifting controller TM donates an oil pressure controller controlling an actuator applied to the synchronizing device of the gear train associated with direct shift depending on each shifting stage.

In the above, a downstream side of the first flow path 11 is in communication with an input shaft IS and a counter shaft CS to receive a necessary lubrication flow rate. This is to sufficiently receive the necessary lubrication flow rate as the input shaft IS and the counter shaft CS interwork with an engine speed (RPM).

The first and second orifices OR1 and OR2 are respectively disposed on the first flow path 11 of the inlet side of the input shaft IS and the counter shaft CS. The first and second orifices OR1 and OR2 control the lubrication flow rate supplied to the input shaft IS and the counter shaft CS.

The line pressure control valve LPCV is a valve that is disposed on the first flow path 11 and controls the oil pressure in the first flow path 11. The line pressure control valve LPCV controls the oil pressure of the first flow path 11 acted on one side end, and the oil pressure by exhausting the flow rate in the first flow path 11 to an intake pipe of the sump (SP) or the mechanical oil pump (MOP) depending on the movement amount of the valve spool while the valve spool moves right and left by the control pressure of the first solenoid valve SOL1 acted on the opposite side to correspond to the oil pressure of the first flow path 11 and the elastic force of the elastic member SG2.

In the above, the first solenoid valve SOL1 may be a normal high type linear solenoid valve.

The electric oil pump EOP is controlled by a transmission control unit (not shown). The electric oil pump EOP pumps the fluid stored in the sump SP to be discharged to the second flow path 12.

The second flow path 12 may interpose the first check valve CV1 to be connected to the line pressure flow path 10. The first check valve CV1 may permit the oil pressure flow from the second flow path 12 to the line pressure flow path 10 and may prevent the oil pressure flow from the line pressure flow path 10 to the second flow path 12.

The first lubrication switch valve SWV1 connected to the downstream side of the second flow path 12 may be the spool valve selectively connecting the second flow path 12 to the third flow path 13.

The first lubrication switch valve SWV1 selectively connects the second flow path 12 and the third flow path 13 while being controlled by the elastic member SG3 disposed at one side end and the control pressure of the second solenoid valve SOL2 acted on the opposite side to correspond to the elastic force of the elastic member SG3.

In the above, the second solenoid valve SOL2 may be a normal low type on/off solenoid valve. The second solenoid valve SOL2 blocks the second flow path 12 and the third flow path 13 in an off state and connects the second flow path 12 and the third flow path 13 in an on state.

The second check valve CV2 is disposed at an upstream side of the third flow path 13. The second check valve CV2 permits the oil pressure flow from the first lubrication switch valve SWV1 to the third flow path 13 and blocks the oil pressure flow from the third flow path 13 to the first switch valve SWV1.

Also, the third flow path 13 interposes the third check valve CV3 to be connected to the first flow path 11. The third check valve CV3 permits the oil pressure flow from the first flow path 11 to the third flow path 13 and blocks the oil pressure flow from the third flow path 13 to the first flow path 11.

Also, the third flow path 13 is branched to two sides. One side flow path 13A of the third flow path 13 is directly connected to the fourth flow path 14, which is connected to the clutch CL through the cooler CLR and the pressure filter PF.

Also, the other side flow path 13B of the third flow path 13 is selectively connected to the fifth flow path 15, which is connected to the downstream side of the fourth flow path 14 through the second lubrication switch valve SWV2.

Also, the sixth flow path 16 is connected to the upstream side of the fourth flow path 14. The sixth flow path 16 is selectively connected to the seventh flow path 17, which is connected to the gear train GT through the second lubrication switch valve SWV2.

The second lubrication switch valve SWV2 may be the spool valve selectively connecting the other side flow path 13B of the third flow path 13 to the fifth flow path 15 or the sixth flow path 16 to the seventh flow path 17.

The second lubrication switch valve SWV2 is controlled by the elastic member SG4 disposed at one side end and the control pressure of the third solenoid valve SOL3 acted on the opposite side to correspond to the elastic force of the elastic member SG4.

The third solenoid valve SOL3 may be the normal low type on/off solenoid valve. The third solenoid valve SOL3 connects the sixth flow path 16 to the seventh flow path 17 in the off state and connects the other side flow path 13B of the third flow path 13 to the fifth flow path 15 in the on state.

The third orifice OR3 is disposed on the fourth flow path 14 between the junction portion of the fourth flow path 14 and the fifth flow path 15 and the junction portion of the fourth flow path 14 and the sixth flow path 16 to control the passing flow rate.

The cooler flow rate control valve CFCV may be disposed in parallel to the cooler CLR and the pressure filter PF between the third flow path 13 and the sixth flow path 16.

The cooler flow rate control valve CFCV may be formed of a spool valve that may variably supply the oil pressure of the third flow path 13 to the sixth flow path 16 when the oil pressure of the third flow path 13 is larger than the oil pressure of the sixth flow path 16 by a predetermined value or more.

Accordingly, the cooler flow rate control valve CFCV controls the flow rate of the third flow path 13 to variably flow to the sixth flow path 16 depending on the movement amount of the valve spool while the valve spool moves right and left by the oil pressure of the third flow path 13 acted on one side end, the oil pressure of the sixth flow path 16 acted on the opposite side to correspond to the oil pressure of the third flow path 13, and the elastic force of the elastic member SG5.

Such a configured oil pressure supply system according to the first embodiment of the present disclosure may supply the flow rate required for the shifting control and the lubrication by only the driving of the mechanical oil pump MOP in the state like FIG. 1 under a RPM driving condition that is more than a middle speed of the engine.

Also, the oil pressure supply system according to the first embodiment of the present disclosure may supply the flow rate required for the shifting control and the lubrication by driving the electric oil pump EOP for assisting the line pressure in the driving condition of a low speed RPM of the engine.

Also, the oil pressure supply system according to the first embodiment of the present disclosure may supply the flow rate required for the lubrication by only driving the electric oil pump MOP in the state like FIG. 1 since the mechanical oil pump MOP is not driven in a condition (i.e., a stopping state of a vehicle (ISG) and a start-stop coasting) in which the engine is not driven.

Figure 2:
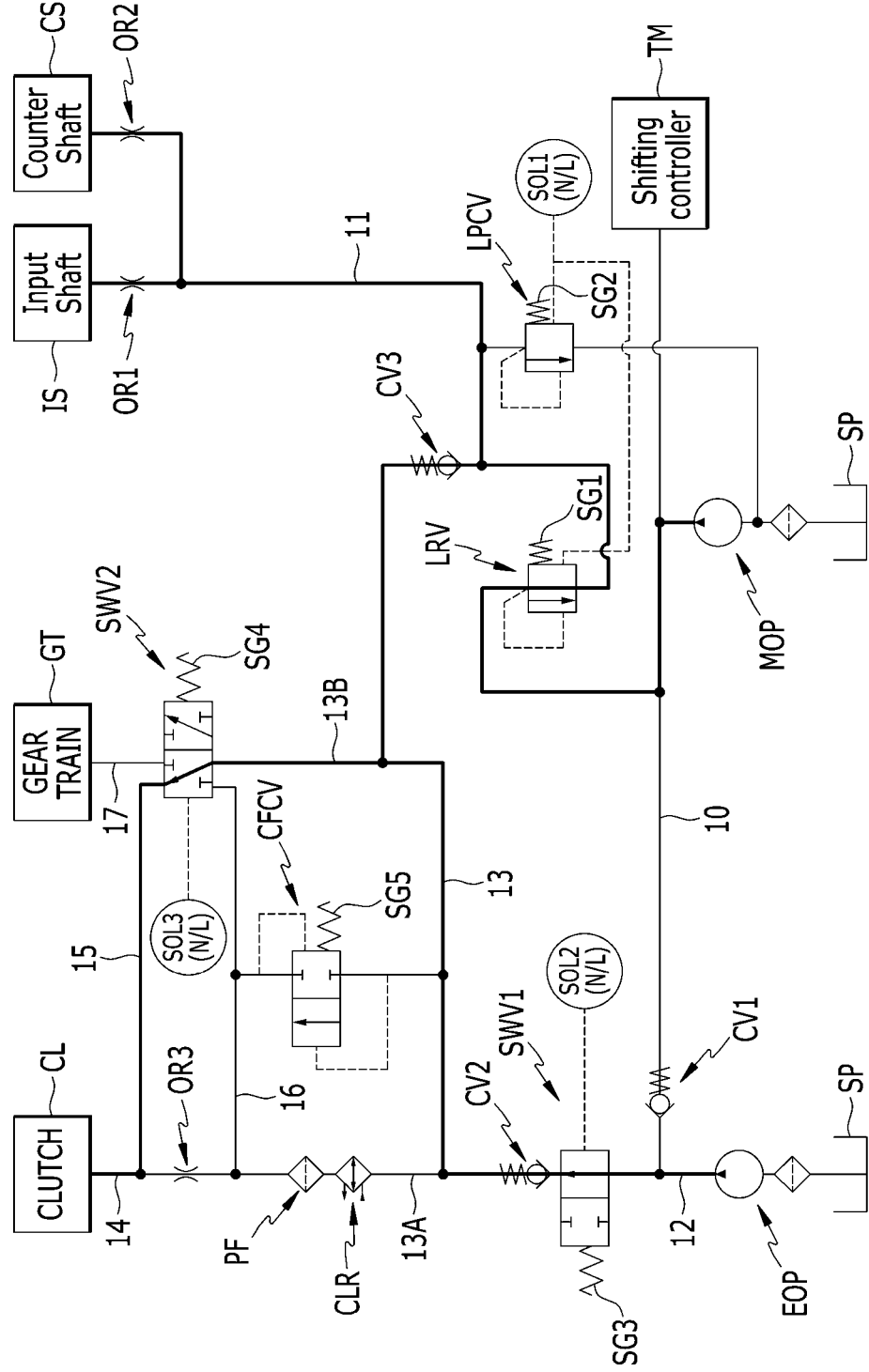
FIG. 2 is an oil pressure flowchart at a clutch large flow rate condition in an oil pressure supply system according to a first embodiment of the present disclosure.

FIG. 2 is an oil pressure flowchart at a clutch large flow rate condition in an oil pressure supply system according to a first embodiment of the present disclosure.

Referring to FIG. 2, in a clutch large flow rate condition, the mechanical oil pump MOP is driven and simultaneously the electric oil pump EOP is driven and controlled for the auxiliary flow rate. The third flow path 13 and the fifth flow path 15 are connected in the second lubrication switch valve SWV2 according to the on control of the third solenoid valve SOL.

Thus, the oil pressure supplied from the mechanical oil pump MOP is supplied to the clutch CL through the first flow path 11, the third flow path 13, the second lubrication switch valve SWV2, the fifth flow path 15, and the fourth flow path 14. Simultaneously, the oil pressure supplied from the electric oil pump EOP is joined to the oil pressure of the mechanical oil pump MOP in the third flow path 13 through the second flow path 12 and the first lubrication switch valve SWV1 and is supplied to the clutch CL.

In this case, the oil pressure of the electric oil pump EOP may be directly bypassed to the third flow path 13 without passing through the cooler CLR and may be joined with the oil pressure of the mechanical oil pump MOP.

Accordingly, the oil pressure supplied from the mechanical oil pump MOP and the electric oil pump EOP may supply the sufficient necessary flow rate of the clutch large capacity condition by being concentratedly supplied to the clutch CL.

Even in the above-described clutch large capacity condition, the oil pressure of the mechanical pump MOP is sufficiently supplied to the shifting controller TM, the input shaft IS, and the counter shaft CS.

Figure 3:
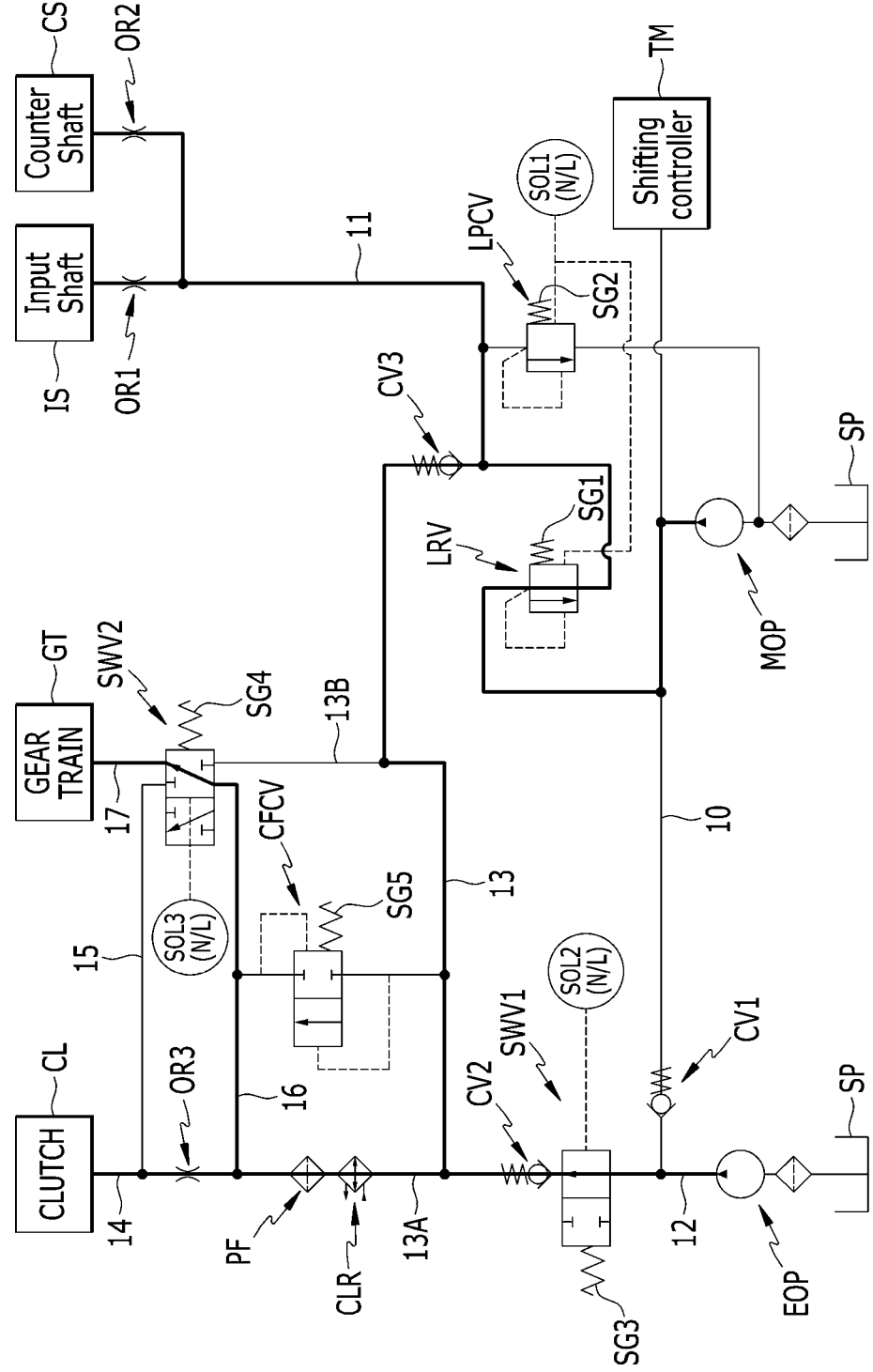
FIG. 3 is an oil pressure flowchart at a gear tooth surface large flow rate condition (a large flow rate on a gear tooth surface) in an oil pressure supply system according to a first embodiment of the present disclosure.

FIG. 3 is an oil pressure flowchart at a gear tooth surface large flow rate condition (a large flow rate on a gear tooth surface) in an oil pressure supply system according to a first embodiment of the present disclosure.

Referring to FIG. 3, in the gear tooth surface large flow rate condition, the mechanical oil pump MOP is driven and simultaneously the electric oil pump EOP is driven and controlled for the auxiliary flow rate. The sixth flow path 16 and the seventh flow path 17 are connected in the second lubrication switch valve SWV2 according to the off control of the third solenoid valve SOL.

Thus, the oil pressure supplied from the mechanical oil pump MOP is supplied to the clutch CL through the first flow path 11, the third flow path 13, the cooler CLR, the pressure filter PF, and the fourth flow path 14 and is simultaneously supplied to the tooth surface of the gears configuring the gear train GT through the sixth flow path 16, the second lubrication switch valve SWV2, and the seventh flow path 17. Simultaneously, the oil pressure supplied from the electric oil pump EOP is joined to the oil pressure of the mechanical oil pump MOP in the third flow path 13 through the second flow path 12 and the first switch valve SWV1 and is supplied.

Accordingly, as the oil pressure supplied from the mechanical oil pump MOP and the electric oil pump EOP is concentratedly supplied to the gear tooth surface of the gear train GT, the sufficient necessary flow rate of the gear tooth surface large capacity condition may be supplied.

Of course, even in the above-described gear tooth surface large capacity condition, the oil pressure of the mechanical pump MOP is sufficiently supplied to the shifting controller TM, the input shaft IS, and the counter shaft CS.

Figure 4:
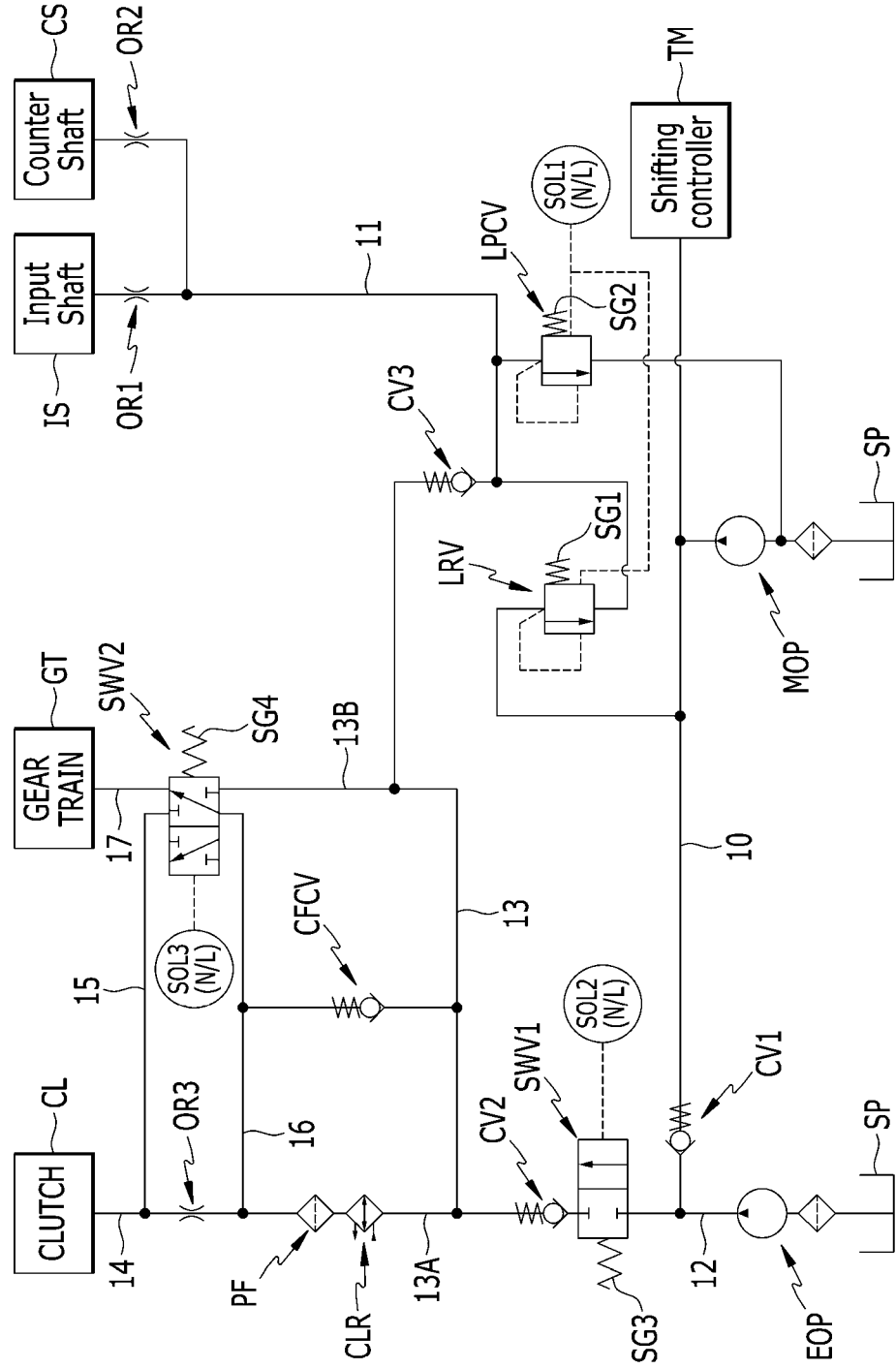
FIG. 4 is an oil pressure circuit diagram of an oil pressure supply system according to a second embodiment of the present disclosure.

FIG. 4 is an oil pressure circuit diagram of an oil pressure supply system according to a second embodiment of the present disclosure.

Referring to FIG. 4, in the first embodiment, the cooler flow rate control valve CFCV configured of the spool valve is disposed between the third flow path 13 and the sixth flow path 16. However, the cooler flow rate control valve CFCV configured of a check valve is disposed in the second embodiment.

Accordingly, in the cooler flow rate control valve CFCV according to the second embodiment, and likewise the first embodiment, when the oil pressure of the third flow path 13 is larger than the oil pressure of the sixth flow path 16 by the predetermined value or more, the oil pressure of the third flow path 13 is variably supplied to the sixth flow path 16, and the reverse flow is blocked.

The second embodiment is different from the first embodiment only in the configuration of the cooler flow rate control valve CFCV and the operation is the same. Thus, the detailed description of other aspects of the second embodiment are omitted.

As above-described, the oil pressure supply system that distributes the lubrication for the dual clutch transmission according to an embodiment of the present disclosure assists the line pressure by the electrical oil pump EOP so as to reduce the capacity of the mechanical oil pump MOP. Thus, the flow rate supply is stable and the driving loss of the mechanical oil pump MOP is reduced, thereby improving the fuel efficiency or reducing fuel consumption.

Also, the oil pressure supply system that distributes the lubrication for the dual clutch transmission according to an embodiment of the present disclosure supplies the lubrication flow rate by the mechanical oil pump MOP to the input shaft IS and the counter shaft CS linked with the engine RPM and appropriately supplies the sum of the lubrication flow rate of the mechanical oil pump MOP and the electric oil pump EOP to the clutch CL and the gear train GT that are linked with the engine RPM. The lubrication driving of the electric oil pump EOP is thus minimized, thereby improving the fuel efficiency or reducing fuel consumption.

Also, the oil pressure supply system that distributes the lubrication for the dual clutch transmission according to an embodiment of the present disclosure minimizes lubrication driving of the electric oil pump EOP and reduces a churning loss by the unnecessary lubrication flow rate. The fuel efficiency may thus be improved. Further, as the necessary flow rate is supplied at a timing that the lubrication is required, a durability of the transmission may be improved.

Also, the oil pressure supply system that distributes the lubrication for the dual clutch transmission according to an embodiment of the present disclosure supplies the oil pressure of the electric oil pump EOP by bypassing the cooler CLR since the clutch CL requires the large flow rate instantaneously during the clutch large flow rate condition. The effective lubrication flow rate supply may thus be obtained.

Also, the oil pressure supply system that distributes the lubrication for the dual clutch transmission according to an embodiment of the present disclosure resultantly reduces the capacity of the mechanical oil pump MOP. The power delivery performance may thus be improved and the fuel efficiency and the transmission durability may be simultaneously improved through the efficiency of the driving condition and the lubrication of the electric oil pump EOP.

While the disclosed invention has been described in connection with what are presently considered to be practical embodiments, it is to be understood that the invention is not limited to the disclosed embodiments. On the contrary, the disclosure is intended to cover various modifications and equivalent arrangements included within the spirit and scope of the appended claims.

What is claimed is:

1. An oil pressure supply system distributing lubrication distribution for a dual clutch transmission, the oil pressure system comprising:
    a mechanical oil pump configured to pump an oil stored in a sump with an oil pressure of high pressure while being driven by an engine;
    a line regulator valve configured to directly supply a lubrication flow rate to an input shaft and a counter shaft, the line regulator valve configured to stably control the oil pressure supplied from the mechanical oil pump and to simultaneously supply the lubrication flow rate to a gear train and clutch through another path;
    a line pressure control valve configured to variably exhaust the lubrication oil pressure when the lubrication oil pressure supplied to the input shaft and the counter shaft is a predetermined value or more;
    an electric oil pump configured to pump the oil stored in the sump with the oil pressure of high pressure while being driven depending on a control of a transmission control unit;
    a first lubrication switch valve configured to selectively block the supply of the oil pressure supplied from the electric oil pump to the gear train and the clutch;
    a second lubrication switch valve configured to switch a flow path so that the oil pressure supplied from the line regulator valve and the first lubrication switch valve is selectively supplied to the gear train and the clutch;
    a line pressure flow path configured to connect the mechanical oil pump and the line regulator valve;
    a first flow path configured to connect the line regulator valve, the input shaft, and the counter shaft;
    a second flow path configured to connect the electric oil pump and the first lubrication switch valve and connected to the line pressure flow path;
    a third flow path connected to the first flow path and the first lubrication switch valve and configured to supply the oil pressure of the first flow path and the first lubrication switch valve to the second lubrication switch valve;
    a fourth flow path connected to the third flow path by interposing a cooler and a pressure filter and configured to supply the oil pressure of the third flow path to the clutch;
    a fifth flow path configured to connect a downstream side of the fourth flow path and the second lubrication switch valve;
    a sixth flow path configured to connect an upstream side of the fourth flow path and the second lubrication switch valve; and
    a seventh flow path configured to connect the second lubrication switch valve and the gear train.

2. The oil pressure supply system of claim 1, wherein:
    the line regulator valve is formed of a spool valve and is controlled by the oil pressure of the line pressure flow path acted on one side end, the control pressure of a first solenoid valve acted on an opposite side to correspond to the oil pressure of the line pressure flow path, and an elastic force of an elastic member.

3. The oil pressure supply system of claim 1, wherein:
    the line pressure control valve is formed of a spool valve and is controlled by the oil pressure of the first flow path acted on one side end, the control pressure of a first solenoid valve acted on the opposite side to correspond to the oil pressure of the first flow path, and the elastic force of the elastic member.

4. The oil pressure supply system of claim 2, wherein:
    the first solenoid valve is a normal high type linear solenoid valve in which the oil pressure is not formed in a normal state.

5. The oil pressure supply system of claim 3, wherein:
    the first solenoid valve is a normal high type linear solenoid valve in which the oil pressure is not formed in a normal state.

6. The oil pressure supply system of claim 1, wherein:
    the first lubrication switch valve is a spool valve that selectively connects the second flow path and the third flow path while being controlled by an elastic member disposed at one side end and the control pressure of a second solenoid valve acted on the opposite side to correspond to the elastic force of the elastic member.

7. The oil pressure supply system of claim 6, wherein:
    the second solenoid valve is a normal low type on/off solenoid valve in which the oil pressure is not formed in a normal state.

8. The oil pressure supply system of claim 1, wherein:
    a second lubrication switch valve is a spool valve that selectively connects the third flow path to the fifth flow path or the sixth flow path to the seventh flow path while being controlled by an elastic member disposed on one side end and the control pressure of a third solenoid valve acted on the opposite side to correspond to the elastic force of the elastic member.

9. The oil pressure supply system of claim 8, wherein:
the third solenoid valve is a normal low type on/off solenoid valve in which the oil pressure is not formed in the normal state.

10. The oil pressure supply system of claim 1, wherein:
a cooler flow rate control valve is disposed in parallel to the cooler and the pressure filter between the fifth flow path and the sixth flow path.

11. The oil pressure supply system of claim 10, wherein:
the cooler flow rate control valve is a spool valve that controls the flow rate of the third flow path depending on a valve spool so as to variably flow to the sixth flow path while the valve spool moves right and left by the oil pressure of the third flow path acted on one side end, the oil pressure of the sixth flow path acted on the opposite side to correspond to the oil pressure of the third flow path, and an elastic force of an elastic member.

12. The oil pressure supply system of claim 10, wherein:
the cooler flow rate control valve is a check valve configured to permit only the flow rate supplied from the third flow path to the sixth flow path.

13. The oil pressure supply system of claim 1, wherein:
three check valves are further provided on the line pressure flow path and the third flow path,
the first check valve permits only the flow rate supplied from the second flow path to the line pressure flow path,
the second check valve permits only the flow rate supplied from the first lubrication switch valve to the third flow path, and
the third check valve permits only the flow rate supplied from the first flow path to the third flow path.

\* \* \* \* \*